US008209204B2

(12) United States Patent
Adler et al.

(10) Patent No.: US 8,209,204 B2
(45) Date of Patent: Jun. 26, 2012

(54) INFLUENCING BEHAVIOR OF ENTERPRISE OPERATIONS DURING PROCESS ENACTMENT USING PROVENANCE DATA

(75) Inventors: Sharon C. Adler, East Greenwich, RI (US); Francisco Phelan Curbera, Hastings on Hudson, NY (US); Yurdaer Nezihi Doganata, Chestnut Ridge, NY (US); Chung-Sheng Li, Scarsdale, NY (US); Axel Martens, White Plains, NY (US); Kevin Patrick McAuliffe, Yorktown Heights, NY (US); Huong Thu Morris, Ridgefield, CT (US); Nirmal K. Mukhi, Ramsey, NJ (US); Aleksander A. Slominski, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 863 days.

(21) Appl. No.: 12/266,052

(22) Filed: Nov. 6, 2008

(65) Prior Publication Data
US 2010/0114630 A1 May 6, 2010

(51) Int. Cl.
*G06F 17/60* (2006.01)
(52) U.S. Cl. ...................................................... 705/7.11
(58) Field of Classification Search .................. 705/7.11
See application file for complete search history.

(56) References Cited

U.S. PATENT DOCUMENTS

| | | | |
|---|---|---|---|
| 6,138,121 A | 10/2000 | Costa et al. | |
| 6,236,994 B1 | 5/2001 | Swartz et al. | |
| 6,604,114 B1 | 8/2003 | Toong et al. | |
| 6,920,474 B2 * | 7/2005 | Walsh et al. | 709/200 |
| 7,039,953 B2 | 5/2006 | Black et al. | |
| 7,200,563 B1 | 4/2007 | Hammitt et al. | |
| 2002/0165745 A1 | 11/2002 | Greene et al. | |
| 2003/0120528 A1 | 6/2003 | Kruk et al. | |
| 2004/0107124 A1 | 6/2004 | Sharpe et al. | |
| 2005/0071207 A1 | 3/2005 | Clark et al. | |
| 2005/0278273 A1 | 12/2005 | Uthe | |
| 2006/0123022 A1 | 6/2006 | Bird | |
| 2006/0149589 A1 | 7/2006 | Wager | |

(Continued)

OTHER PUBLICATIONS

Altintas et al "Provenance Collection Support in the Kepler Scientific Workflow System", Dec. 2006, L. Moreau and I. Foster (Eds): IPAW, pp. 118-132.*

(Continued)

*Primary Examiner* — Romain Jeanty
(74) *Attorney, Agent, or Firm* — William Stock; Ryan, Mason & Lewis, LLP

(57) ABSTRACT

Techniques are disclosed for influencing behavior of enterprise operations during process enactment using provenance data. For example, a computer-implemented method of influencing a behavior of an enterprise process comprises the following steps. Provenance data is generated, wherein the provenance data is based on collected data associated with at least a partial actual execution of the enterprise process and is indicative of a lineage of one or more data items. A provenance graph is generated that provides a visual representation of the generated provenance data, wherein nodes of the graph represent records associated with the collected data and edges of the graph represent relations between the records. At least a portion of the generated provenance data from the graph is analyzed to generate an execution pattern corresponding to the at least partial actual execution of the enterprise process. The execution pattern is compared to one or more previously stored patterns. A determination is made as to whether or not to alter the enterprise process based on a result of the comparison.

20 Claims, 13 Drawing Sheets

U.S. PATENT DOCUMENTS

| | | | |
|---|---|---|---|
| 2006/0184410 | A1 | 8/2006 | Ramamurthy et al. |
| 2006/0242180 | A1 | 10/2006 | Graf et al. |
| 2006/0253477 | A1 | 11/2006 | Maranhao |
| 2006/0277523 | A1 | 12/2006 | Horen et al. |
| 2007/0088957 | A1 | 4/2007 | Carson |
| 2007/0156478 | A1 | 7/2007 | Breene et al. |
| 2007/0266166 | A1 | 11/2007 | Cohen et al. |
| 2007/0276711 | A1 | 11/2007 | Shiu et al. |
| 2007/0283417 | A1 | 12/2007 | Smolen et al. |
| 2008/0040181 | A1 | 2/2008 | Freire et al. |
| 2008/0077530 | A1 | 3/2008 | Banas et al. |
| 2008/0082377 | A1 | 4/2008 | Kennis et al. |
| 2008/0103854 | A1 | 5/2008 | Adam et al. |
| 2008/0120281 | A1 | 5/2008 | Marceau et al. |
| 2008/0126399 | A1 | 5/2008 | MacGregor |

OTHER PUBLICATIONS

"BPM for Compliance to Reduce Risk, Time, and Cost," Global 360, Optimizing Business Processes, 2005, 12 pages.

http://theory.stanford.edu/~amitp/GameProgramming/AStarComparison.html#S2, 2009, 8 pages.

J. Freire et al., "Provenance for Computational Tasks: A Survey," IEEE Computing is Science & Engineering, May/Jun. 2008, pp. 20-30, vol. 10, No. 3.

Y.L. Simmhan et al., "A Survey of Data Provenance in e-Science," SIGMOD Record, Sep. 2005, pp. 31-36, vol. 34, No. 3.

R. Bose et al., "Lineage Retrieval for Scientific Data Processing: A Survey," ACM Computing Surveys, Mar. 2005, vol. 37, No. 1, pp. 1-28.

A-W. Scheer et al., "ARIS Architecture and Reference Models for Business Process Management," 2000, pp. 366-379.

W.M.P. Van Der Aalst et al., "Workflow Patterns," Distributed and Parallel Databases, Jul. 2003, pp. 1-70, vol. 14, No. 3.

"BPM Process Patterns," Fuego BPM White paper, http://edocs.bea.com/albsi/docs55/pdfs/BPM%20Process%20Patterns%20White%20Paper.pdf, Jan. 2006, 25 pages.

S. Ceri et al., "What You Always Wanted to Know About Datalog (and Never Dared to Ask)," IEEE Transactions on Knowledge and Data Engineering, http://doi.ieeecomputersociety.org/10.1109/69.43410, 1989, pp. 146-166, vol. 1, No. 1.

L. Moreau et al., "The Open Provenance Model," Dec. 2007, pp. 1-26.

Y.L. Simmhan et al., "A Framework for Collecting Provenance in Data Centric Scientific Workflows," Proceedings of the IEEE International Conference on Web Services (ICWS), Sep. 2006, 8 pages.

U.S. Appl. No. 12/265,975 filed in the name of Sharon C. Adler et al. Nov. 6, 2008 and entitled "Processing of Provenance Data for Automatic Discovery of Enterprise Process Information."

U.S. Appl. No. 12/265,986 filed in the name of Sharon C. Adler et al. Nov. 6, 2008 and entitled "Validating Compliance in Enterprise Operations Based on Provenance Data."

U.S. Appl. No. 12/265,993 filed in the name of Sharon C. Adler et al. Nov. 6, 2008 and entitled "Extracting Enterprise Information Through Analysis of Provenance Data."

\* cited by examiner

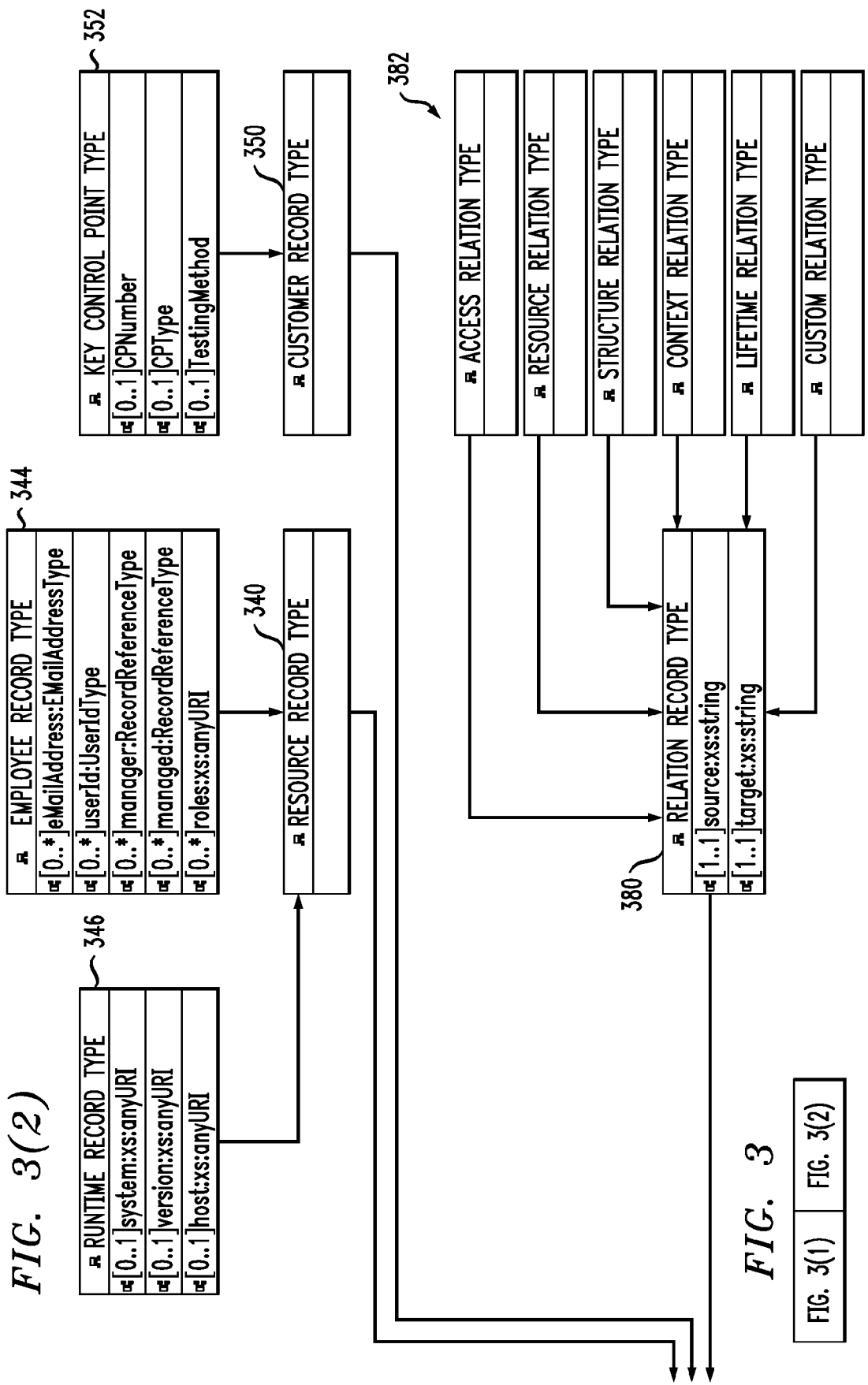

INFLUENCING BEHAVIOR OF ENTERPRISE OPERATIONS DURING PROCESS ENACTMENT USING PROVENANCE DATA

CROSS REFERENCE TO RELATED APPLICATIONS

The present application is related to the U.S. patent applications respectively identified as: (i) Ser. No. 12/265,975, entitled "Processing of Provenance Data for Automatic Discovery of Enterprise Process Information;" (ii) Ser. No. 12/265,986, entitled "Validating Compliance in Enterprise Operations Based On Provenance Data;" and (iii) Ser. No. 12,265,993, entitled "Extracting Enterprise Information through Analysis of Provenance Data," all of which are filed concurrently herewith, and the disclosures of which are incorporated by reference herein in their entirety.

FIELD OF THE INVENTION

The present invention relates to provenance data and, more particularly, to techniques for influencing behavior of enterprise operations during process enactment using provenance data.

BACKGROUND OF THE INVENTION

Often enterprise processes rely on human activities and cannot be fully automated. This results in unpredictable behavior in the course of process execution.

Typically, when anomalies are detected during process execution, alerts are generated. The process owners react to these alerts by reengineering or redesigning the process. This approach, however, is costly and time consuming. Besides, reactive approaches may not successfully change the course of process execution and hence may not stop anomalies.

SUMMARY OF THE INVENTION

Illustrative embodiments of the invention provide techniques for influencing behavior of enterprise operations during process enactment using provenance data.

For example, in one embodiment, a computer-implemented method of influencing a behavior of an enterprise process comprises the following steps. Provenance data is generated, wherein the provenance data is based on collected data associated with at least a partial actual execution of the enterprise process and is indicative of a lineage of one or more data items. A provenance graph is generated that provides a visual representation of the generated provenance data, wherein nodes of the graph represent records associated with the collected data and edges of the graph represent relations between the records. At least a portion of the generated provenance data from the graph is analyzed to generate an execution pattern corresponding to the at least partial actual execution of the enterprise process. The execution pattern is compared to one or more previously stored patterns. A determination is made as to whether or not to alter the enterprise process based on a result of the comparison.

Advantageously, embodiments of the invention provide techniques to control the flow of work after process enactment is started and to change the behavior of the enterprise operation, which saves enterprises significantly against integrity lapses and penalties.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
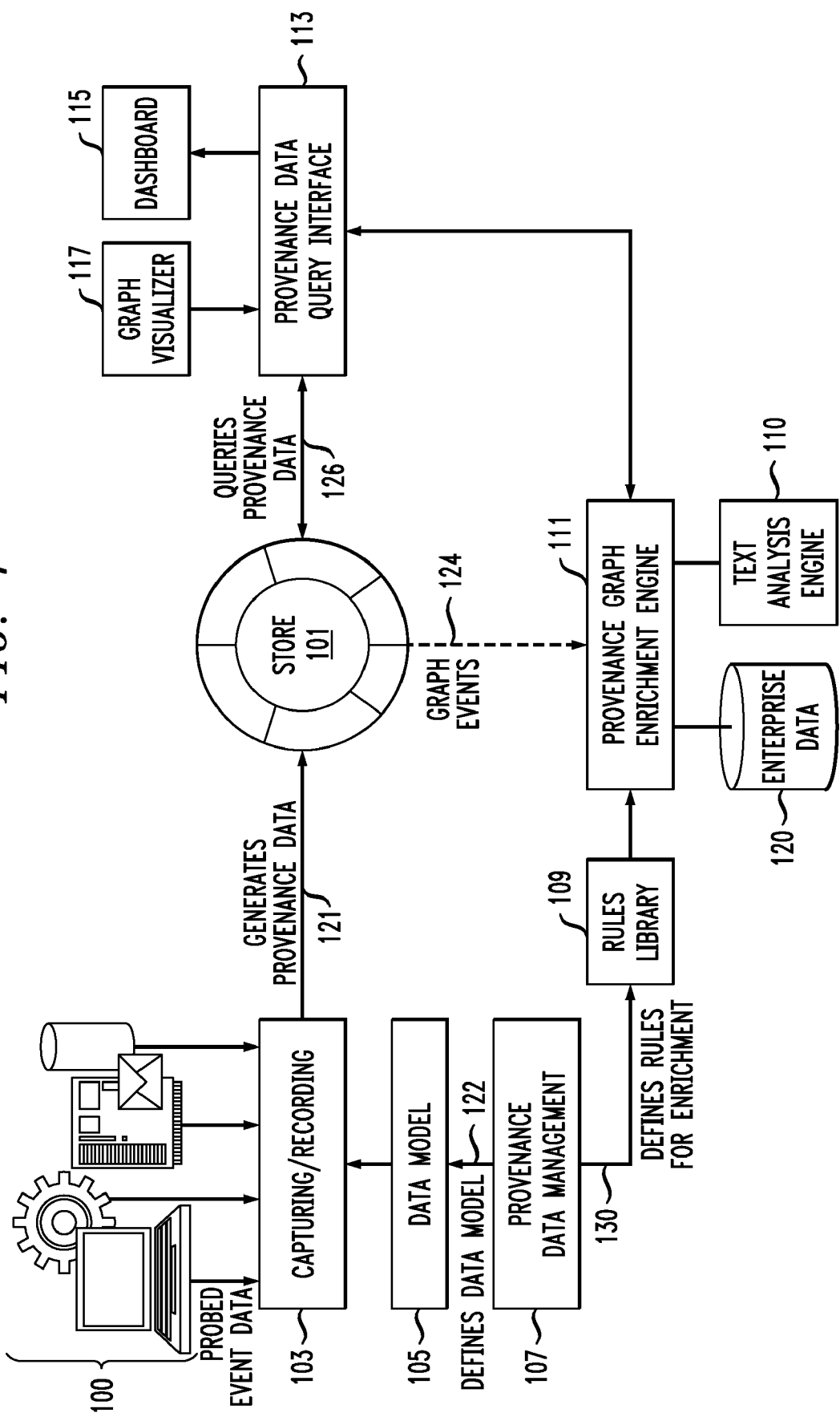
FIG. 1 illustrates a system for processing provenance data for automatic discovery of enterprise process information, according to an embodiment of the invention.

As used herein, the term "enterprise" is understood to broadly refer to any entity that is created or formed to achieve some purpose, examples of which include, but are not limited to, an undertaking, an endeavor, a venture, a business, a concern, a corporation, an establishment, a firm, an organization, or the like. Thus, "enterprise processes" are processes that the enterprise performs in the course of attempting to achieve that purpose. By way of one example only, enterprise processes may comprise business processes.

As used herein, the term "provenance" is understood to broadly refer to an indication or determination of where something, such as a unit of data, came from or an indication or determination of what it was derived from. That is, the term "provenance" refers to the history or lineage of a particular item. Thus, "provenance information" or "provenance data" is information or data that provides this indication or results of such determination. By way of one example only, enterprise provenance data may comprise business provenance data.

Further, as used herein, the term "practice" (e.g., enterprise practice or business practice) is understood to broadly refer to methods, procedures, processes, and rules employed or followed by an enterprise in the pursuit of its objectives.

Principles of the invention provide techniques for dynamically influencing the behavior of enterprise operations. A main goal is to avoid a potential violation or anomaly before it happens by intervening at a process execution engine once the deviation from the planned execution is detected.

As an example, consider a user who is given access rights to a confidential database without sufficient credentials. Traditionally, this could be detected as a result of monitoring the activities, and alerts are generated. The proactive approach of the invention, however, stops the process execution when this user attempts to access the database even before his ID (identification) is deleted from the list of people who have access rights to the database. Another example is the case when a user skips a necessary task or starts a task out of sequence. If such behavior is allowed, it may result in violating certain enterprise rules. The proactive approach of the invention enables intervening and stopping process execution and forcing the user to go back to the task that was skipped.

Thus, analyzing the process execution to discover practices and detecting potential anomalies is the first step of the inventive approach. Advantageously, the flow of work dynamically changes during enactment to avoid potential practice violations based on this analysis.

More particularly, embodiments of the invention utilize the provenance of process execution to determine anomalies. The system and method described herein notifies the process enactment subsystem for potential practice violations. This information is then used to interrupt the execution or change the process execution pattern. The execution pattern is built dynamically based on the type of notification. This is accomplished by stopping some of the processes to avoid further violations or enforce a certain practice while starting the execution of some new processes.

Accordingly, embodiments of the invention use enterprise provenance technology where relevant enterprise data is captured in time and mapped onto a graph. Provenance in a general sense is used in scientific experiments to reproduce the results. Provenance of enterprise data gives information about the lineage of what has happened. In this case, the purpose is not to reproduce but to use the history of events to predict the future and take action. The actual enterprise practices may be different than the original design due to uncertainty in human actions. Capturing the execution trace as a graph is a convenient way of identifying these discrepancies.

Embodiments of the invention enable storing practices in a library that are recommended or the practices that should be avoided in terms of graph entities through which execution traces are captured. This library is used as a reference to compare against actual executions. The event of process execution creates new graph entities from which the execution pattern is detected and compared with a pattern stored in the library. The decision to change the behavior is taken once a discrepancy is detected between a library pattern and actual execution pattern.

Below, the detailed description, in Section I, provides illustrative embodiments of an enterprise provenance approach that provides for creation and maintenance of a provenance data model and graph. This approach is disclosed in the above-referenced U.S. patent application identified as Ser. No. 12/265,975, entitled "Processing of Provenance Data for Automatic Discovery of Enterprise Process Information," filed concurrently herewith and incorporated by reference herein in its entirety. Section II of the detailed description below then provides description of the above-mentioned illustrative embodiments for influencing behavior of enterprise operations during process enactment using provenance data.

I. Provenance Data Model and Graph

We define an enterprise provenance approach as one that comprises capturing and managing the lineage of enterprise artifacts to discover functional, organizational, data and resource aspects of an enterprise. Examining enterprise provenance data gives insight into the chain of cause and effect relations and facilitates understanding the root causes of the resultant event.

In one embodiment of the invention, our approach comprises the following steps: (1) identifying the control points, relevant enterprise artifacts and required correlations; (2) probing the actual execution of the enterprise process to collect data; (3) correlating and enriching the collected data and the relations among them to create a provenance graph; (4) analyzing aggregated information to enable enterprise activity monitoring or to interfere with the execution by generating alerts; and (5) providing access to information stored in the graph for detailed investigation and root cause analysis.

FIG. 1 shows a system for capturing and processing provenance data for automatic discovery of enterprise process information, according to an embodiment of the invention. The enterprise process information discovery system comprises storage unit 101, multi-capturing/recording components 103, provenance data management sub-system 107, rules library 109, provenance graph enrichment engine 111, text analysis engine 110, enterprise data repository 120, provenance data query interface 113, graph visualizer 117 and dashboard 115.

The provenance data management component 107 supports the specification of the provenance data model 105, i.e., the list of enterprise objects to be captured and the level of details. It is also used to define the correlation rules between two data records. Capturing/recording components 103 are used to capture, process, and reformat application events of the underlying information system 100 (including, for example, computers, servers, repositories, email systems and other enterprise systems) and record the meta-data of enterprise operations into the provenance store. Hence, capturing/recording components 103 map the captured event data onto the data model defined (122) by provenance data management component 107. The information is then transferred (121) to storage unit 101, which is the store for provenance data.

Provenance data management component 107 generates rules (130) that are stored in rules library 109 for provenance graph enrichment engine 111. The rules define a correlation between the enterprise artifacts which is then used to connect them in the provenance graph representation.

Provenance graph enrichment engine 111 links and enriches the collected data to produce the provenance graph. To do so, provenance graph enrichment engine 111 accesses (126) the content of the provenance store 101 through provenance data query interface 113 as well as the original enterprise data. It also employs text analysis engine 110 to discover relationships among data records by analyzing the unstructured text contained in some of the data records. As an example, the analysis of e-mail may reveal that it is a rejection and is used to establish a link between the e-mail and an approval task.

The enriched enterprise data is accessed through query interface 113 and is used to display information about actual enterprise operations. This can be done in one of several ways. One way is to deploy a query into the provenance store which emits the results in real-time, feeding an existing dashboard 115 in order to display key performance indicators as an example. Secondly, a query front-end enables visualization and navigation through the provenance graph by using graph visualizer component 117.

The central component of the architecture is data store 101 where the provenance graph and the associated data records are kept. When the probed event data coming from the runtime systems 100 is transformed into provenance data by capturing/recording component 103, they are written to the store through a database connection (121). As new data are captured and recorded, provenance graph enrichment engine 111 is notified via connection 124. Provenance graph enrichment engine 111 examines the new data records and run associated rules from the rules library, utilizes the existing enterprise data as well as text analysis engine 110 to determine a possible correlation. If new data items or relations are discovered, they are written to the province store via query interface 113.

Ensuring compliance through the information system 100 requires laying out a data model that covers the relevant aspects of the enterprise operations. Creating a data model is the first step to bridge enterprise operations to information systems. The data model should support relevant and salient aspects of the enterprise.

Figure 2:
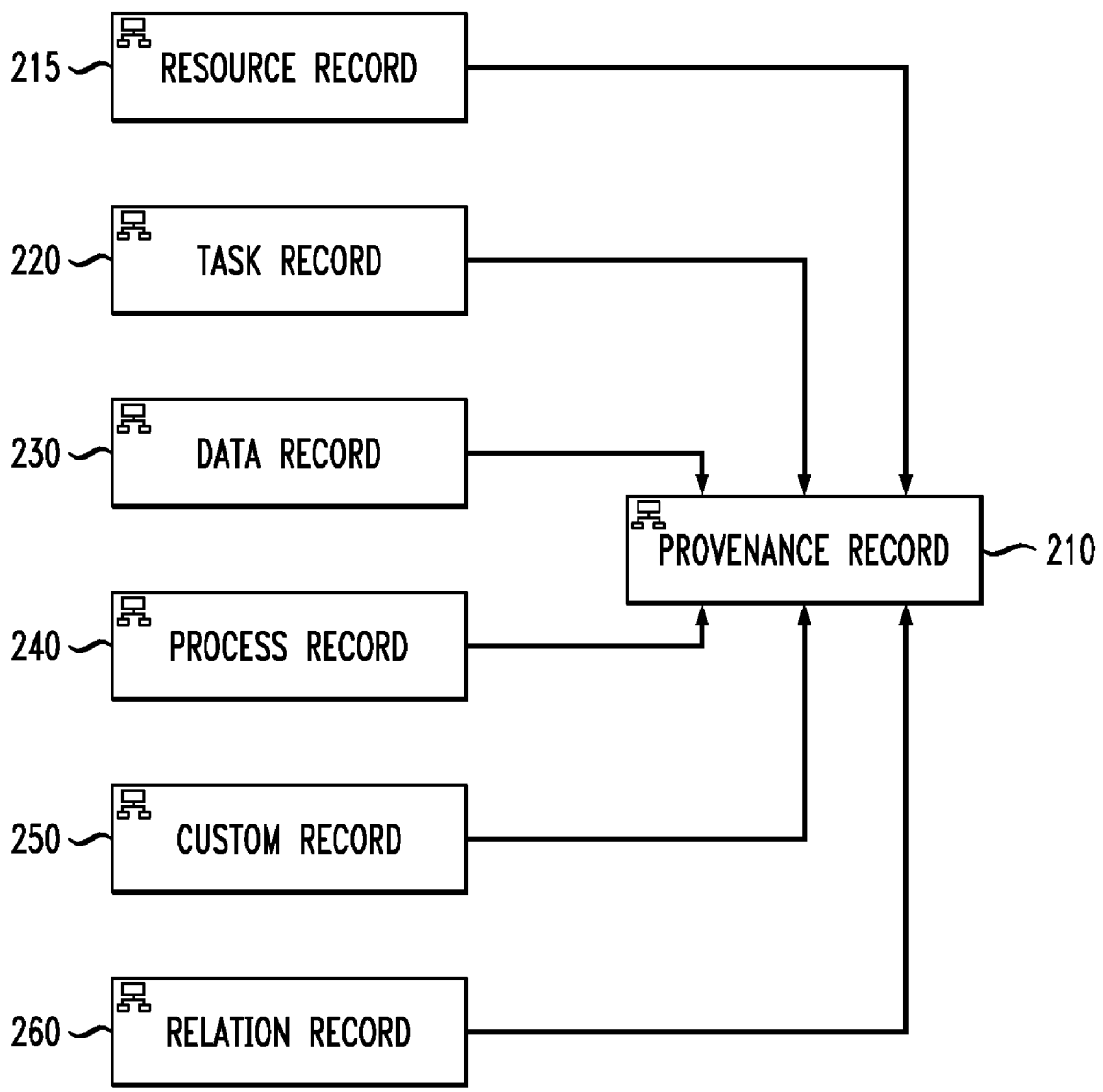
FIG. 2 illustrates a provenance record, according to an embodiment of the invention.

FIG. 2 illustrates a comprehensive, generic data model that can be extended to meet the domain specific needs. As shown, the data of enterprise artifacts stored in the provenance store, depicted as Provenance Record 210, falls into one of the following five dimensions or classes:

Data Record 230: A data record is the representation of an enterprise artifact that was produced or changed during execution of an enterprise process. Typically, those artifacts include documents, e-mails, and database records. In the provenance store, each version of such an artifact is represented separately.

Task Record 220: A task record is the representation of the execution of one particular task. Such task might be part of a formally defined enterprise process or be stand alone; it might be fully automated or manual.

Process Record 240: A process record represents one instance of a process. In automated enterprise management systems, tasks are executed by processes. Hence, each task is associated to the corresponding process record.

Resource Record 215: A resource record represents a person, a runtime or a different kind of resource that is relevant to the selected scope of enterprise provenance, e.g., as actor of a particular task.

Custom Records 250: Custom records provide the extension point to capture domain specific, mostly virtual artifacts such as compliance goals, alerts, checkpoints, etc. This will be explained in greater detail below.

These five classes of records represent the nodes of the provenance graph. To define the correlation between two records, Relation Records 260 represent the edges. These are the records generally produced as a result of relation analysis among the collected records. For simplicity of explanation, we only consider binary relations between records. However, relations between relation records are possible and such higher degree relation could be expressed in accordance with illustrative principles of the invention. Some relations are rather basic on the IT (information technology) level, such as the read and write between tasks and data. Other relations are derived from the context, such as that between manager and achieved challenge.

As mentioned above, the inventive enterprise provenance solution provides a generic data model that can be extended to meet the application domain specific needs.

Figure 3:
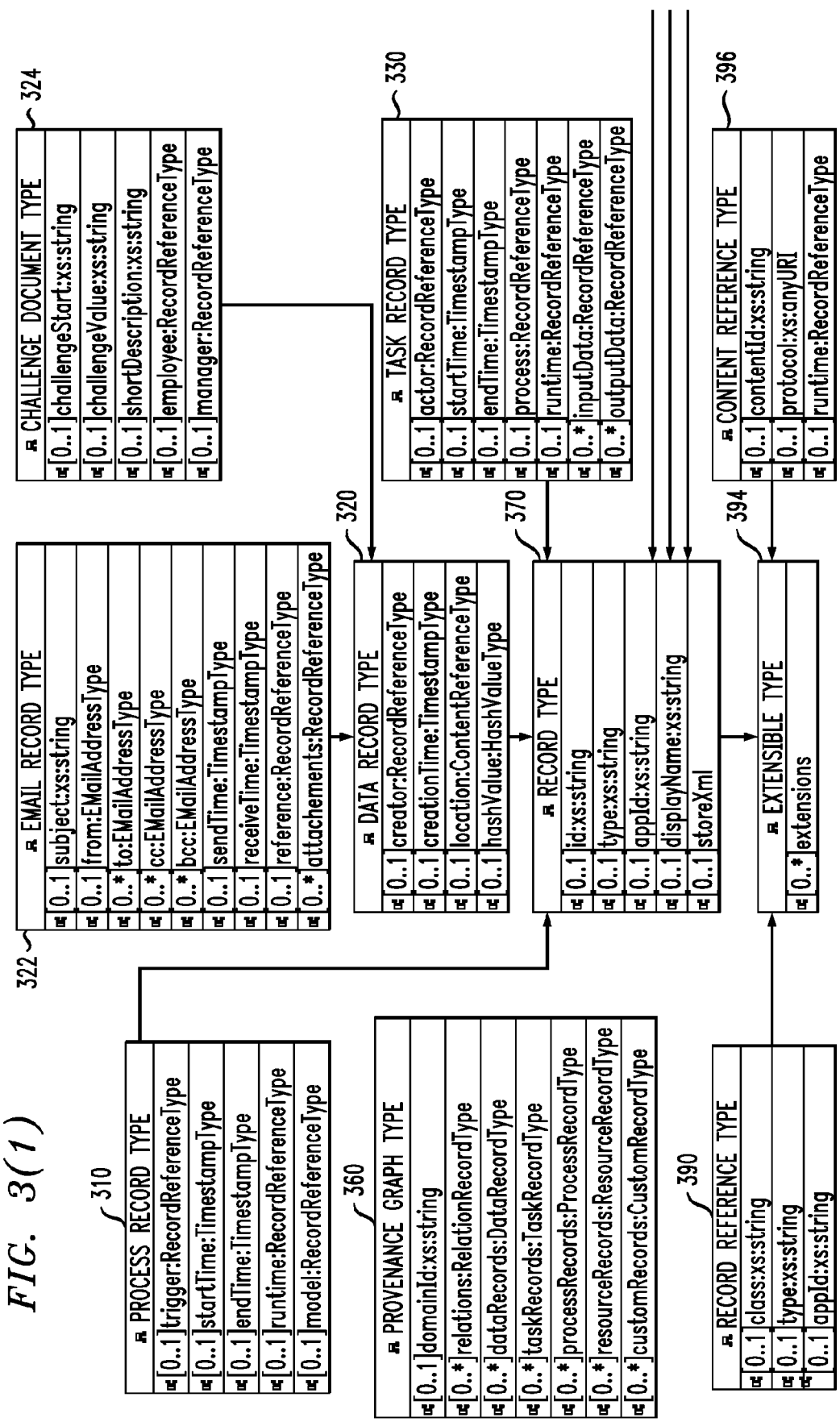
FIG. 3 illustrates a provenance data model, according to an embodiment of the invention.

FIG. 3 depicts the UML (Unified Modeling Language) representation of the provenance graph data model. Basically, the provenance graph comprises six different sets of records, namely, Process 310, Data 320, Task 330, Resource 340, Relation 380 and Custom 350 record types. Each record is an extensible XML data structure and all records share common attributes: id and type are used to identify and classify the record within the graph; the appId (application specific id) and display name refer to characteristics of the corresponding enterprise artifact. These attributes are inherited from a parent record type, RecordType 370. Data, task and process records are added to the provenance graph as the business operations are executed. Resource and custom records are often added after the fact by analytics. Those five record classes represent the nodes of the provenance graph. A semantic relation between two enterprise artifacts is expressed by an edge between the corresponding nodes materialized as a relation record. FIG. 3 shows several specializations of the basic record types. The challenge document and key control point type, however, are specific to a particular application.

ProcessRecordType 310 is differentiated from the other record types by trigger, startTime, endTime, runtime and model attributes. DataRecordType 320, on the other hand, has creator, creation Time, location, hashValue attributes. These attributes are consistent with the original purpose of having these records in the graph. In FIG. 3, two data record types are exemplified which are specific to a particular application; EmailRecordType 322 and ChallengeDocumentType 324. Email record type contains all the attributes necessary to represent an e-mail document such as subject, from, to, cc, bcc, sendTime, receiveTime, reference, attachments while ChallengeDocumentType represents an application specific document attributes.

Relations connect to provenance records. Hence, a RelationRecordType 380 has source and target attributes. Various other relation types are also depicted as extensions of RelationRecordType in 382.

In order to keep the data model generic and flexible, CustomRecordType 350 is introduced and KeyControlPointType 352 is shown as an example to a custom record type. KeyControlPointType 352 is used to relate records to a particular compliance control point. ProvenanceGraphType 360 is introduced to represent the attributes of the graph which are listed as relations, dataRecords, taskrecords, processRecords, resourceRecords, customRecords. In addition to the graph attributes, the domainId attribute is introduced to specify the particular domain for which this provenance graph is generated. EmployeeRecordType 344 contains the attributes that define an employee within the organization. These attributes are listed as an email address, a userid, indicator of being a manager or not, the name of employee's manager and employee's role in executing the tasks. A recordType 370 is the parent of all record types from where they inherit id, type, application id, display name and xml attributes. The children of recordType 370 are ProcessRecordType 310, DataRecordType 320, TaskrecordType 330, CustomRecordType 350 and RelationRecordType 370, as mentioned previously. Following the concept of object oriented modeling, ExtensibleType 394 can be considered the ancestor of all types which has three children, namely, RecordType (370), RecordReferenceType (390) and ContentReferenceType (396). ExtensibleType passes one attribute, extensions, to the children. This attribute gives flexibility to have multiple extensions of the same model. The content and record reference types, ContentReferenceType 396 and RecordReferenceType 390 are used to refer to the location of actual data. Note that the provenance graph is a meta-information repository and the actual data resides within the enterprise at the addresses specified in record and content reference types. Resource RecordType (340) has two children. That is, there are two kinds of resource records, employees and machines. These are the entities that activate task items. In the model, employee resource is represented by EmployeeRecordType 344 and machine resources are represented as RuntimeRecordType (346).

In order to demonstrate how a provenance graph captures various aspects of the enterprise, we take a closer look at a sample scenario related to distribution of variable compensation of sales employees. Our example represents a simplified version of the actual process seen in a customer engagement. The process can be described as follows: A sales employee receives commissions for the generated revenue or profit as variable part of his income. To align these incentives specifically to the line of business, geography, and individual situation of the employees, managers create challenges. A challenge is a document that describes in detail each sales target and the associated compensation. If an employee is able to provide evidence about the achievement of a particular challenge, commission is added to his next payment statement as an incentive.

Figure 4A:
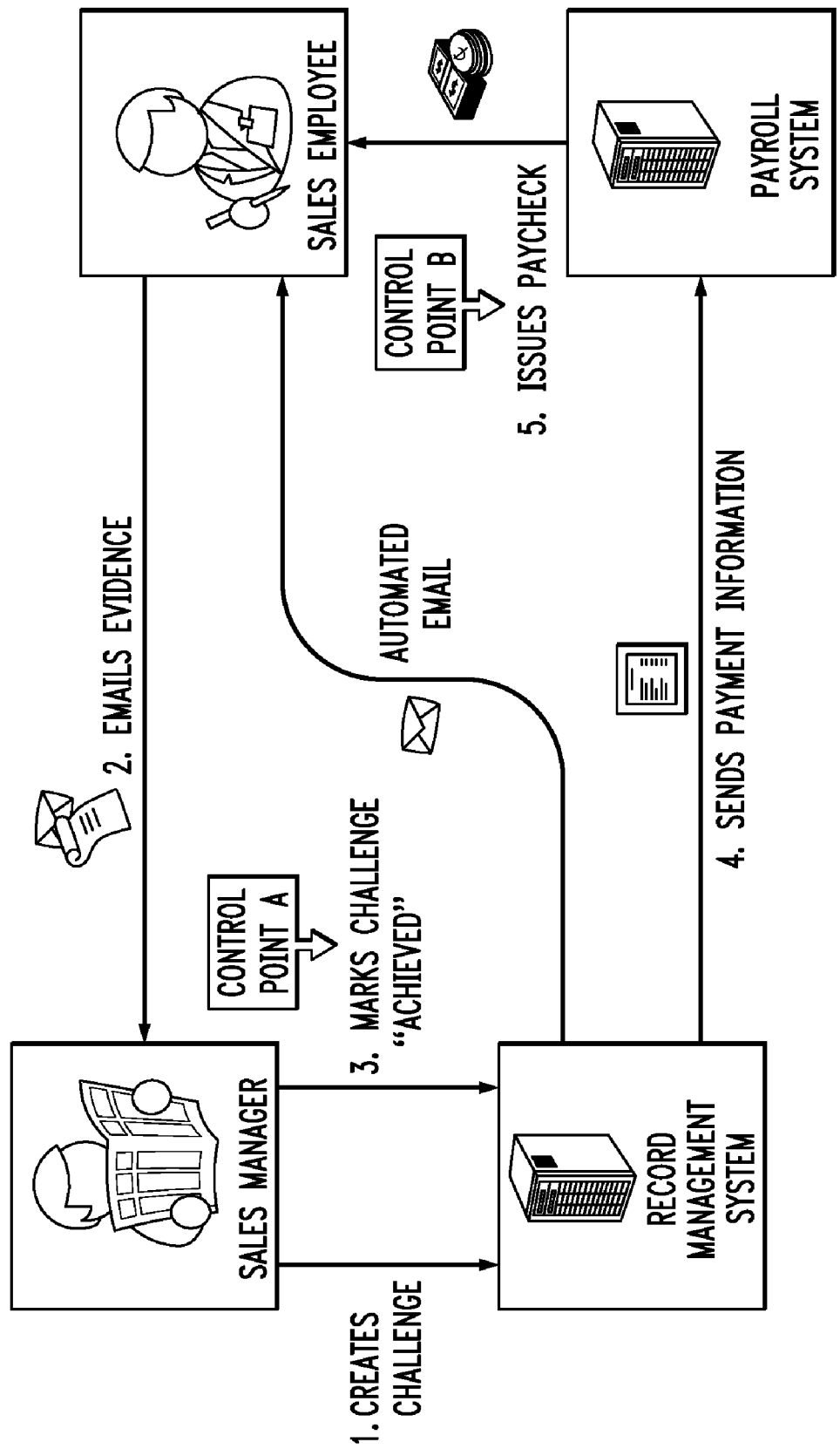
FIG. 4A illustrates an enterprise application scenario used to generate sample provenance graph, according to am embodiment of the invention.

Although from modeling point of view there is one end-to-end process instance that spans all activities from the creation of a particular challenge to the issuance of the corresponding payment statement, in practice, various distributed systems are involved in the execution of the process. Processing structured as well as unstructured documents and running formal sub-processes as well as ad-hoc tasks increases the operational complexity. FIG. 4A illustrates this scenario.

In the first step, the manager creates the challenge (1) using a Web-front-end to the central record management system. This task triggers an automated email informing the employee about the challenge. To claim the achievement, the employee has to provide evidence (2)—which can take various forms: a contract or receipt, a fax from the sales customer, a pointer to a different revenue database, etc. Typically, the evidence is available electronically and it is attached to an e-mail sent to his manager by the employee. Upon reviewing the evidence, the manager evaluates the challenge and, in case of achievement, marks its status (3). Periodically, the latest achievement data is collected and fed into the payroll system (4). Finally, the paycheck is issued to the employee (5).

In order to assure the compliance of the overall process with legal accounting regulations, various control points are introduced. Each control point reflects one locally verifiable requirement is validated today manually for a small number of sampled transactions by internal and/or external auditors. Typically, control points are established for the interaction of various systems and the verification of the control point requires the correlation of structured and/or unstructured data. In FIG. 4A, the two control points are shown. Control point A requires the manager to obtain, evaluate carefully, and maintain the evidence of any achieved challenge. Control point B requires the paycheck to reflect the accumulated commissions correctly.

To verify control point A, an auditor selects an achieved challenge, requests the evidence, and compares the sales targets with the documented achievements. This seemingly simple task has proven to be quite complicated in practice. Firstly, the evidence is not directly linked to the challenge. In some cases, it is not even stored in a central repository but kept locally by the manager. The auditor therefore has to contact the manager, and the manager has to find the right documents. Our observations have shown compliance failure rate of 70%, largely because the evidence could not be located. Also, we have observed lengthy email exchanges between an auditor and a manager until the correct evidence could be identified. As a result of this cumbersome process, only a small fraction of the total number of transactions can be sampled, which implies a high number of undetected questionable situations and possibly fraud. In addition, there had been no support available to track down the root-cause once a questionable situation was detected. This is a major drawback of the existing auditing method. To enable an enterprise to prevent future wrongdoing or simply to detect a pattern of fraudulent behavior, it is essential to answer the following question: "Why did this happen?" Our proposed enterprise provenance approach targets exactly this question.

In the given example, one might argue that the process is not well designed. But regardless how carefully an application is architected, there will always be gaps between the different systems involved, there will always be data that does not fit into predefined forms, and there will always be exceptions in the execution. Rather than requiring a full scale, heavyweight data integration, our approach focuses on the recording of meta-data of relevant objects and events into a centralized and easily accessible store with links into the original systems; the automated correlation of those meta-data to establish execution traces, versioning histories, and other relevant relations; and finally the deep analysis to detect situations after the fact, raise alerts while monitoring continuously, and even interfere with the execution to prevent compliance violations.

Figure 4B:
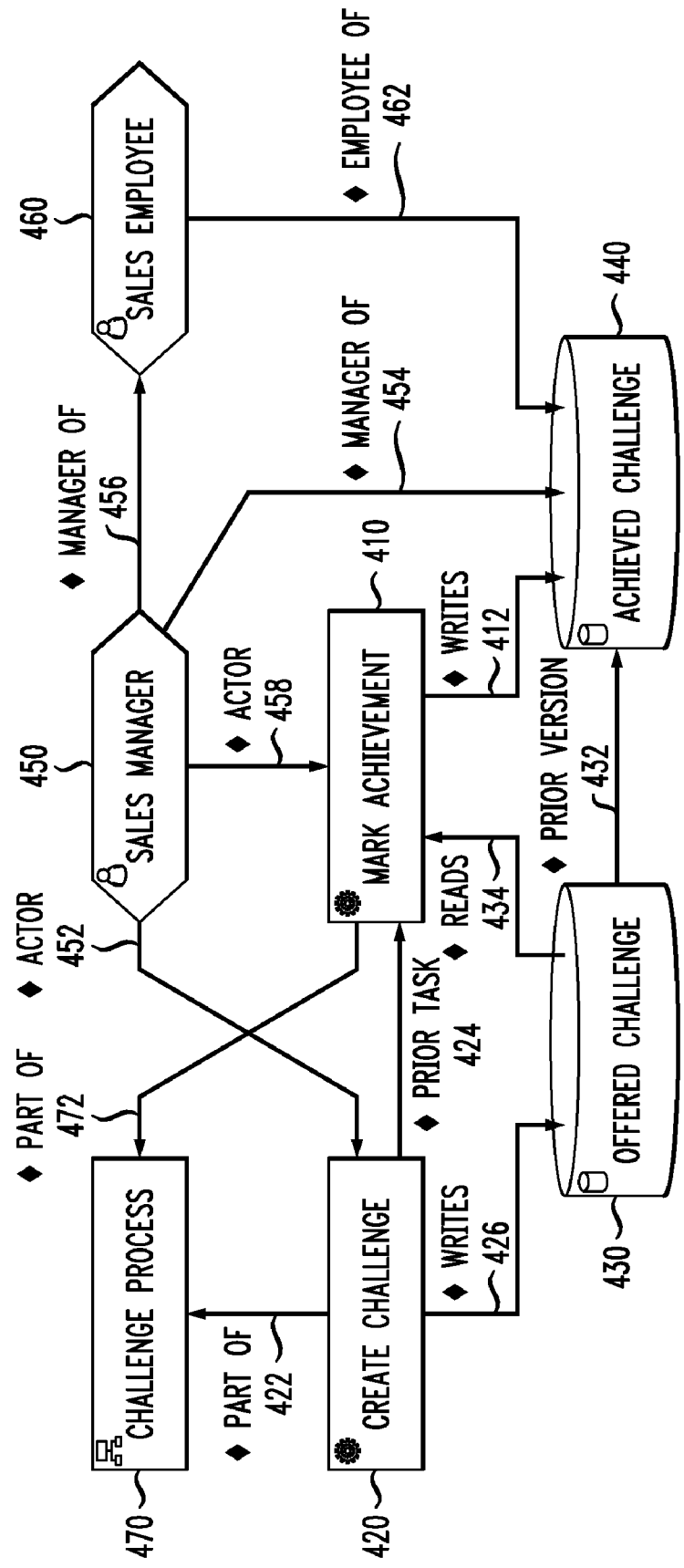
FIG. 4B illustrates a provenance graph extracted from an enterprise scenario, according to an embodiment of the invention.

FIG. 4B depicts the provenance graph for the scenario explained above. The relevant enterprise artifacts and their relations with respect to the scenario are illustrated. DataRecord types are identified by cylindrical shapes while ResourceRecord types are hexagonal, and TaskRecord types are rectangular. Thus, with respect to the scenario in FIG. 4A, the corresponding task records are represented in FIG. 4B as ChallengeProcess node 470, CreateChallenge node 420, and MarkAchievenment node 410. Further, the corresponding resource records are represented as SalesManager node 450 and SalesEmployee node 460. Corresponding data records are represented as OfferedChallenge node 430 and AchievedChallenge node 440. The diamond shapes on the edges between nodes represent the corresponding relation records: partOf 422, writes 426, priorVersion 432, reads 434, priorTask 424, actor 452, partOf 472, actor 458, managerOf 454, writes 412, managerOf 456, employeeOf 462.

Figure 4C:
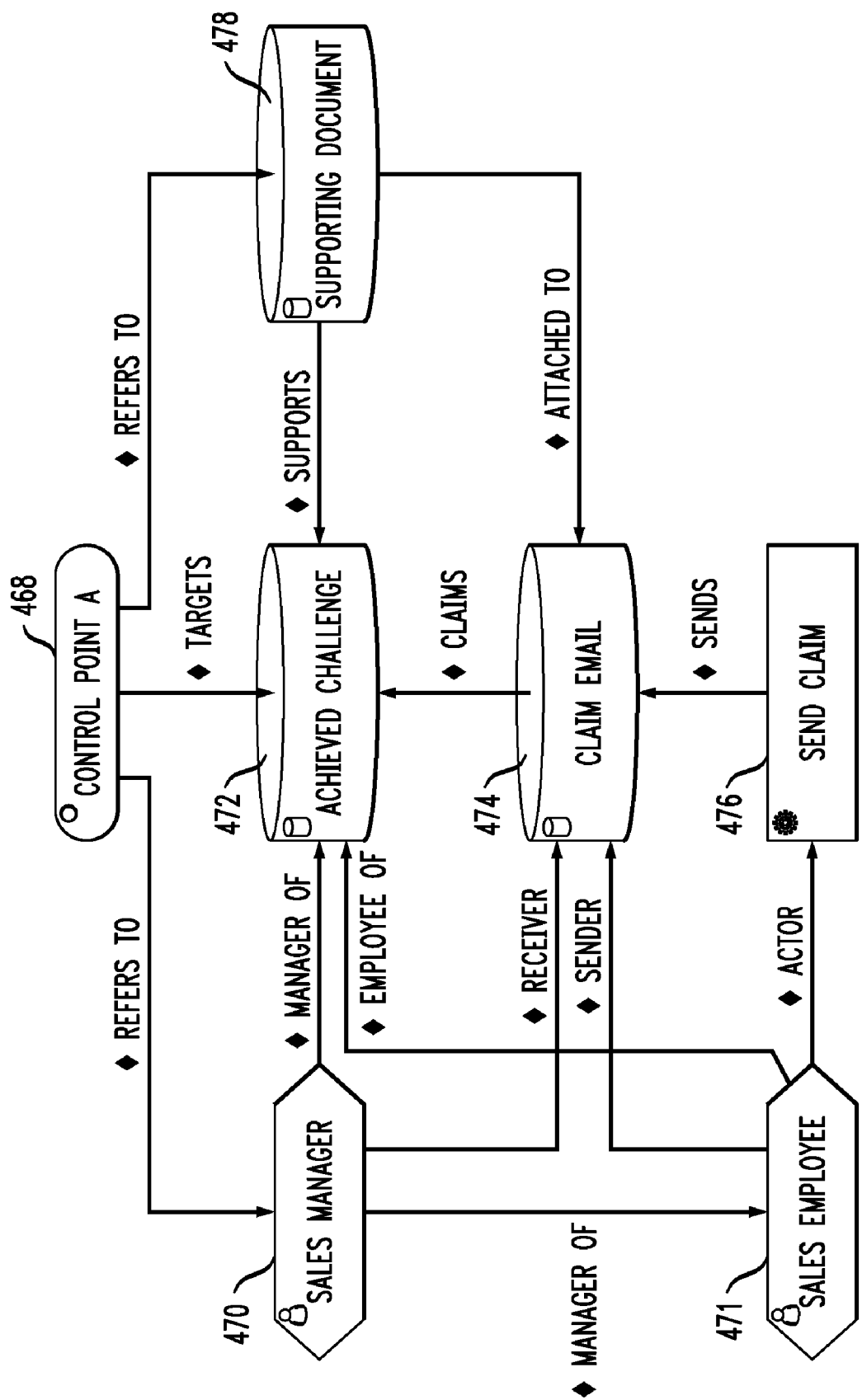
FIG. 4C illustrates a provenance sub-graph that represents a control-point, according to an embodiment of the invention.

The provenance sub-graph of FIG. 4C shows how to represent a control point (in particular, control point A shown in FIG. 4A) which indicates a requirement that sales manager must obtain and review the supporting document that supports the achieved challenge. Representing control points at the IT level enables computing compliance automatically.

More particularly, with respect to the scenario in FIG. 4A, the corresponding task record is represented in the sub-graph of the control point (468) in FIG. 4C as SendClaim node 476. Further, the corresponding resource records are represented as SalesManager node 470 and SalesEmployee node 471. Corresponding data records are represented as AchievedChallenge node 472, ClaimEmail node 474, and SupportingDocument node 478. Again, the diamond shapes on the edges between nodes represent the corresponding relation records. For the sake of simplicity, they have not been separately numbered since their specific relationships to the nodes they attach are dependent on the process being modeled (and fully understood from the scenario explained above in the context of FIG. 4A).

Figure 5:
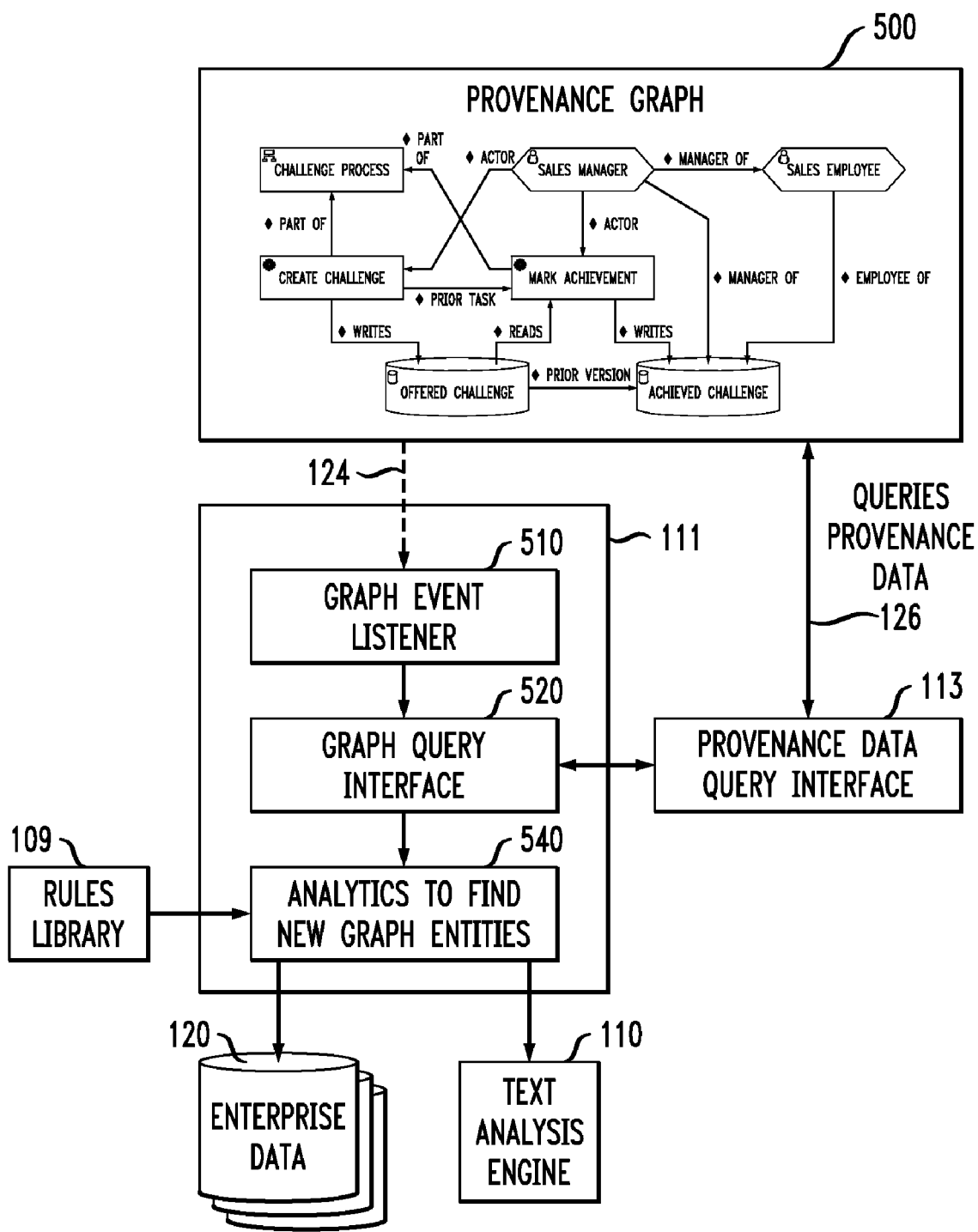
FIG. 5 illustrates a provenance graph enrichment process, according to an embodiment of the invention.

FIG. 5 shows the process of enriching the provenance graph. Provenance graph 500 is enriched by finding the relations among existing provenance records and discovering the new ones. The relations among the provenance records are defined by the rule files stored in the rule library 109. As an example, a simple rule may indicate that if the value of "From" field of an e-mail document is equal to the e-mail address of a person record, "sender" relation is set between the e-mail DataRecord and the person ResourceRecord. For every new item created in the graph, provenance graph enrichment engine 111 is notified via a graph event listener 510. The attributes of these newly created records are queried through graph query interface 520 and the received information is passed to the analytics component 540.

The main function of the analytics is to find relations or new records by computing the rules stored in the rules library 109 over the attributes of provenance records. Existing enterprise data 120 could also be used to find new relations, such as management or organizational relations. Text analysis engine 110 is employed when rules require the analysis of an unstructured content.

II. Influencing Behavior During Process Enactment Using Provenance Data

Embodiments of the invention presented herein analyze process behavior by examining the execution traces which are captured by a provenance graph. Creation of a provenance graph from execution traces is described above in section I. Recall that, in a provenance graph, the data model captures the relevant aspects of the enterprise including control-flow, data-flow and organizational aspects. Enterprise data is collected from various processes and organized into data, task, resource and process categories. The relations between data records are extracted.

Figure 6:
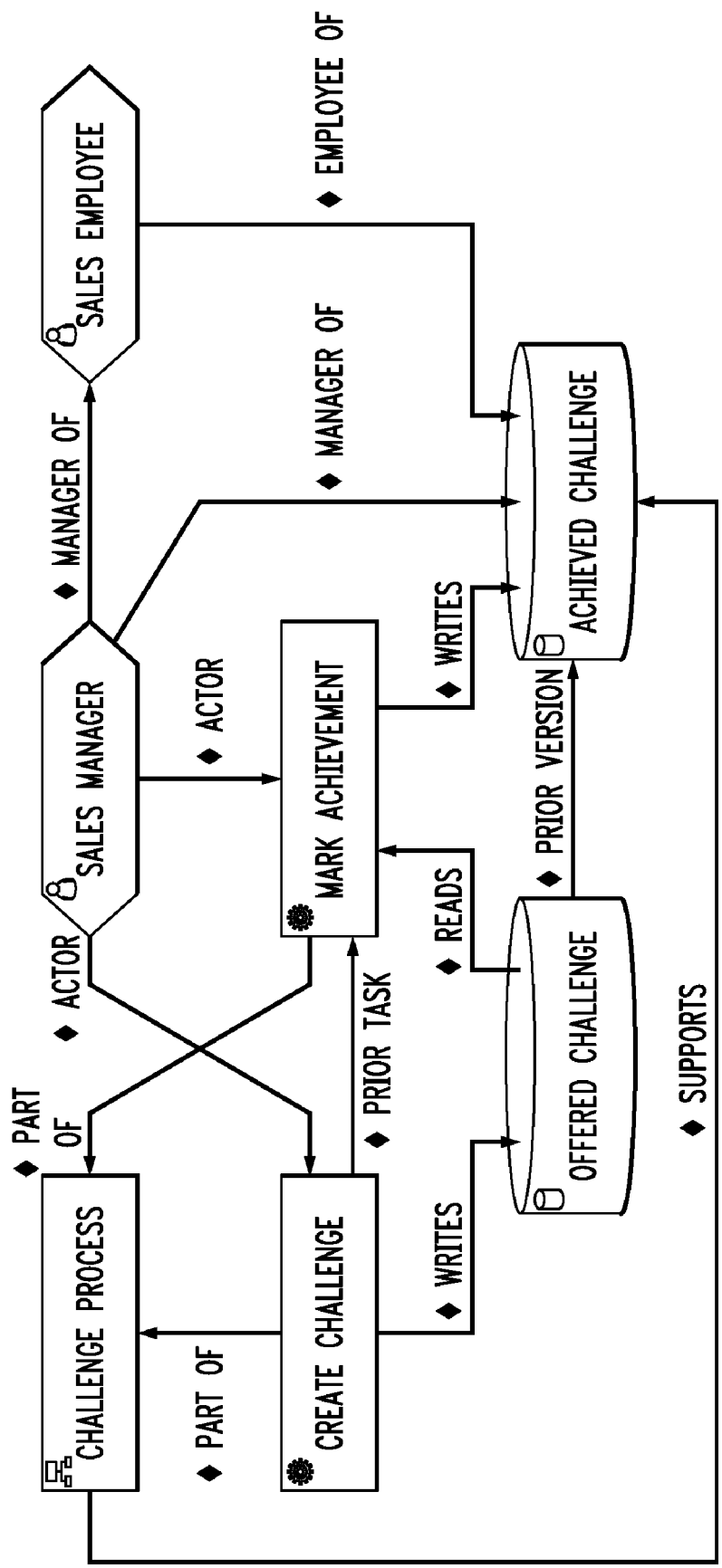
FIG. 6 illustrates a sample provenance graph, according to an embodiment of the invention.

As a result, a graph is formed where the nodes are enterprise data records and edges are the relations between these records. An example of such a graph is depicted in FIG. 6. The flow of control and data can be extracted from a provenance graph by displaying the task and data records and their relations.

Figure 7:
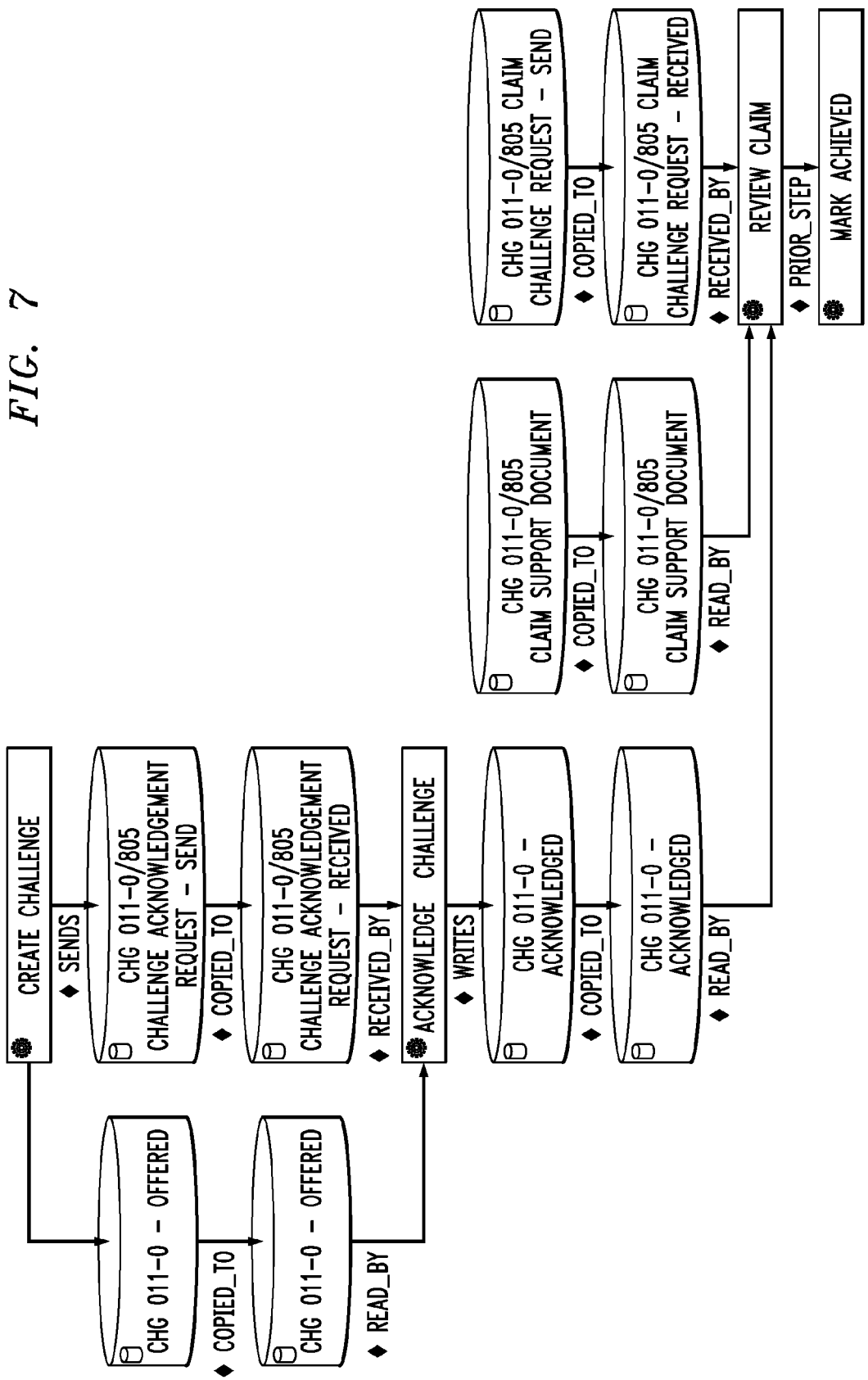
FIG. 7 illustrates a sample workflow extracted from a provenance graph, according to an embodiment of the invention.

FIG. 7 depicts an example flow of control and data for a sample enterprise process. The control and data flow are the process execution patterns used to detect anomalies. Task and Data records are shown with different iconic representation. The cylinder icon represents data, while the gear icon represents a task. The task records that are depicted in FIG. 7 are createChallenge, ackknowledgeChallenge, reviewClaim and markAchieved. The flow in FIG. 7 shows the task sequence and the associated data records consumed or generated by each task. Similarly, the actor of each task can also be extracted from the provenance graph by looking up the actors of each task. As an example, FIG. 6 shows that the SalesManager is the actor of CreateChallenge and MarkAchievement tasks. These are simple examples to demonstrate that the provenance graph contains information about various aspects of the enterprise and can be mined to answer questions about how cases are actually being executed or evolved in the organization.

Figure 8:
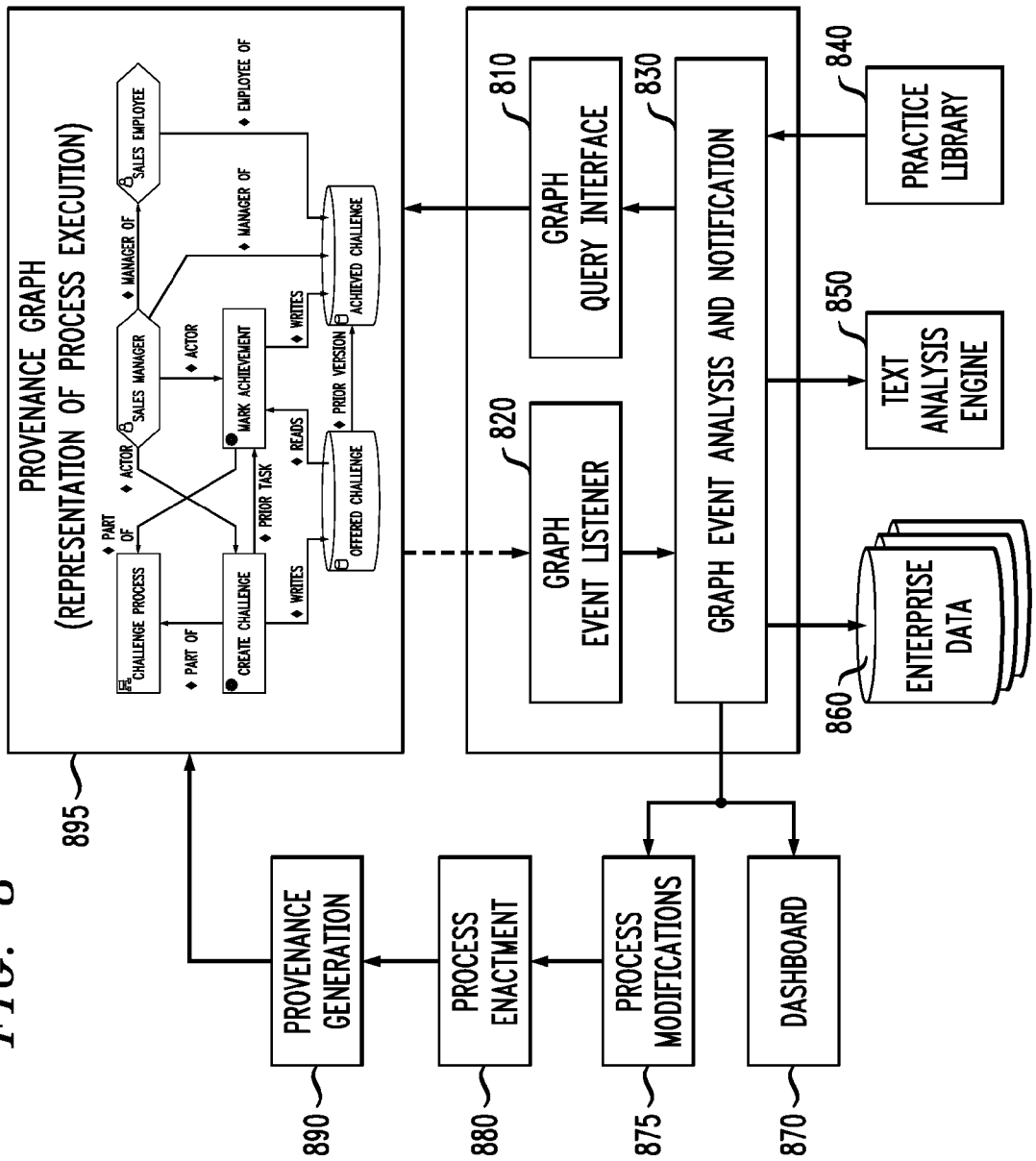
FIG. 8 illustrates an enterprise operation behavior influencing system, according to an embodiment of the invention.

FIG. 8 illustrates an embodiment of an enterprise operation behavior influencing system. In FIG. 8, provenance generation 890 is a subsystem that uses the techniques of section I to generate provenance graph 895. In general, subsystem 890 collects event data from the underlying IT (information technology) system, maps the event data onto a provenance graph data model, and stores them in a repository.

Many questions about actual execution can be answered by searching the graph properties of the provenance data. Provenance data query interface 810 provides the query interface for the other sub-components to query provenance graph properties.

A number of known languages are available to query a directed graph such as a provenance graph. One example is SPARQL (Simple Protocol and RDF Query Language) for RDF (Resource Description Framework) which is a directed, labeled graph data format. In one implementation, provenance graph query interface 810 provides for a set of SPARQL interfaces to access graph information 895. These include, for example, graph nodes, edges, their connections, paths between the nodes, etc.

Graph event listener 820 is a component that listens and reports all the new activity on the provenance graph. All graph events related to new edge and node generations are reported by the graph event listener to graph event analysis and notification subsystem 830.

Each graph event is analyzed in subsystem 830 to determine if the event is in accordance with the practices stored in practice library 840. The practice library is composed of practices expressed in terms of provenance graph elements. These practices may be categorized as best, recommended, anomalies or violations.

As an example, a graph event may show that an employee performing a read on some financial data is a violation, if the practice library 840 shows that the connection of the employee to financial data as a reader is a violation. So, the practice library is composed of categorized list of sub-graphs. When a new graph event arrives, the graph event analysis and notification subsystem 830 sends a set of queries to the provenance graph 895 via graph query interface 810. The queries are built based on the entries of the practice library 840 to determine if the new graph event generates one of the practices listed in the library.

Figure 9:
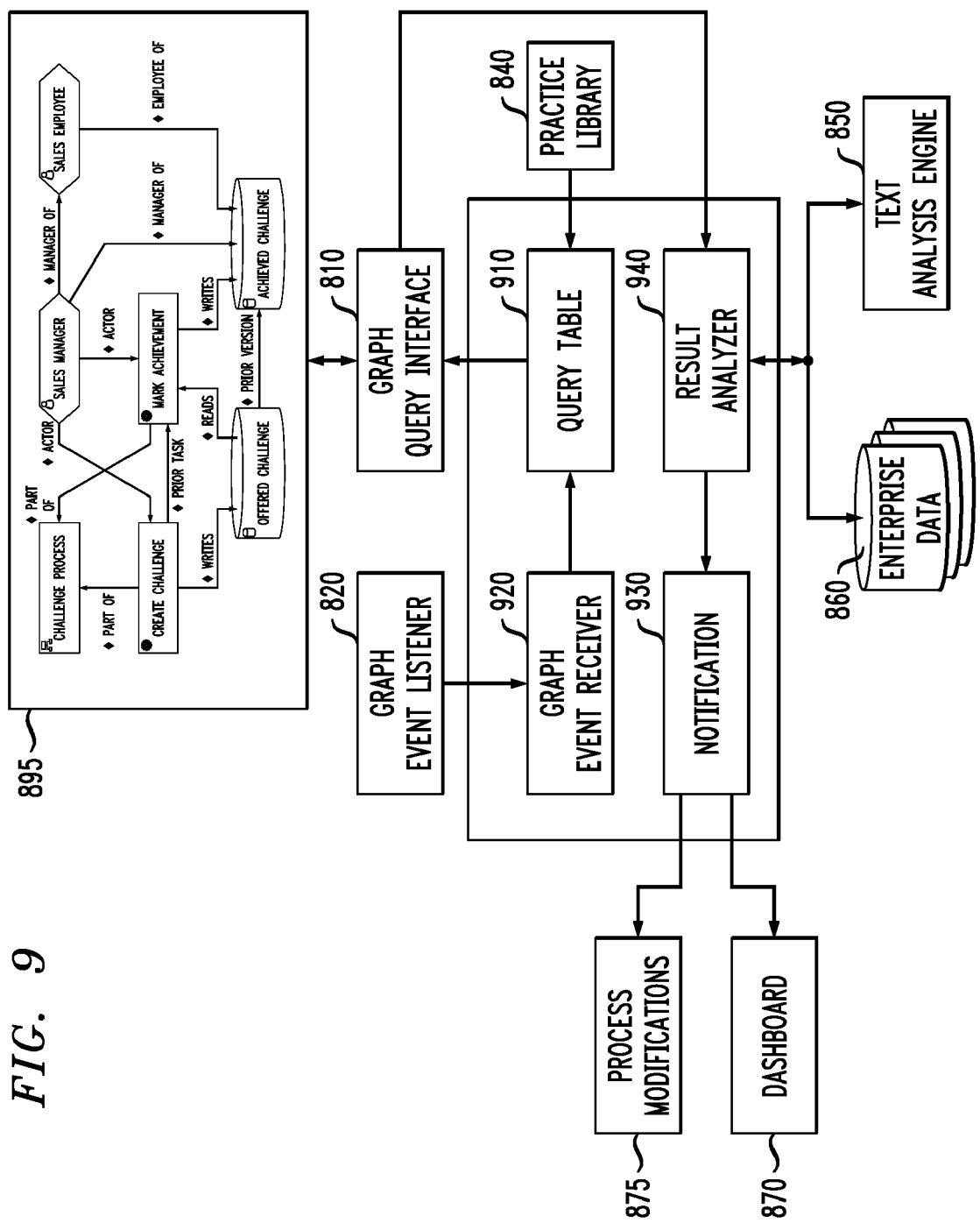
FIG. 9 illustrates a graph event analysis and notification component, according to an embodiment of the invention.

FIG. 9 depicts the subcomponents of the graph event analysis and notification subsystem 830. Queries are built based on the graph event (received from graph event listener 820 via grant event receiver 920) and the practices listed in the library 840 in query table builder 910. Query building process comprises selecting a query from the list of pre-formed queries based on the type of graph event. As an example, assume the practice is to get the approval of a manager before acting on a certain task. As soon as the graph event about employee performing the task is received, the query that seeks for an approver relation between the manager and the task is fired. The result of the query is retrieved by result analyzer 940 and it contains the graph properties sought around the new graph event. If the retrieved result is about unstructured text and requires further processing, text analysis engine 850 is used. Enterprise data 860, such as employee records, is also available to be used for result analysis. Result analyzer 940 has a list of actions to take based on the result of the analysis. The results and the associated actions are displayed in dashboard 870 through notification subcomponent 930. Notification system 930 is capable of interacting with process modification subcomponent 875. This way, the process may be interrupted or changed during enactment. This may be necessary to avoid violations with a high severity measure.

Figure 10:
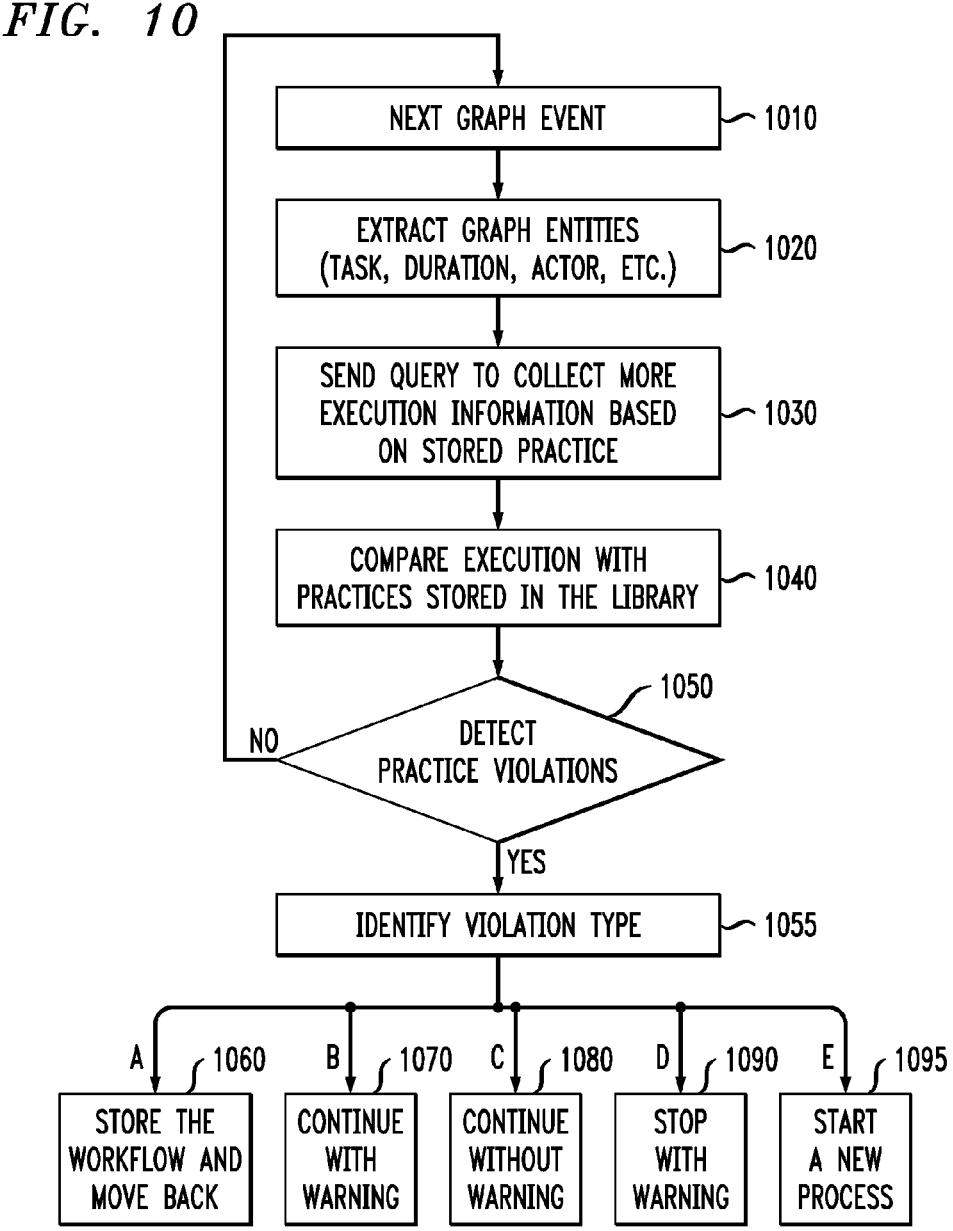
FIG. 10 illustrates a methodology for identifying practice violation and type, according to an embodiment of the invention.

FIG. 10 shows the decision flow before the process modification subcomponent 875 is invoked. From the graph event 1010, the executed task, associated actor and the task duration are identified 1020. More execution information around the event is collected by sending a query to the graph based on the practices stored in the library (1030). Since practices are stored as sub-graphs, queries can be built to extract the nodes and edges that are used to express the practice. The query returns the actual practice from the provenance graph and it is compared with the practice in the library (1040).

If the comparison yields a violation (1050), the type of violation is identified (1055) and an appropriate action command is fired to the process modification subsystem 875 through notification component 830. Based on the type of violation, different actions are taken: (i) the workflow is stopped and execution steps are taken back to a prior point (1060); (ii) the process continues with warning 1070; (iii) the process continues without warning (1080); (iv) the process stops with warning (1090); or (v) a new process is started (1095). Such "warnings" or "alerts" can be sent by the dynamic process-behavior influencing system to a system administrator and/or another automated subsystem, depending on the nature of the violation.

By using the interface between the process modification subcomponent 875 and the process enactment subsystem 880, the process execution is intervened. As a result, process enactment is dynamically changed.

Figure 11:
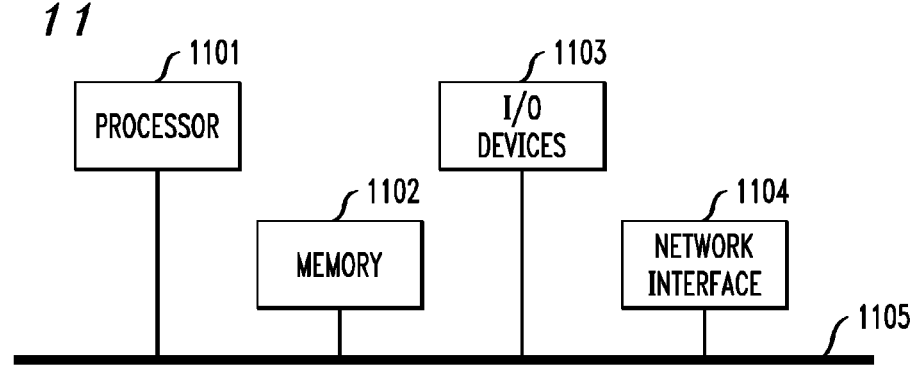
FIG. 11 illustrates a computer system in accordance with which one or more components/steps of the techniques of the invention may be implemented, according to an embodiment of the invention.

Lastly, FIG. 11 illustrates a computer system in accordance with which one or more components/steps of the techniques of the invention may be implemented. It is to be further understood that the individual components/steps may be implemented on one such computer system or on more than one such computer system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computer system shown in FIG. 11 may represent one or more of the components/steps shown and described above in the context of in FIGS. 1 through 10. For example, the computer system may be used to implement one or more of the components of the behavior influencing system depicted in FIG. 8.

The computer system may generally include a processor 1101, memory 1102, input/output (I/O) devices 1103, and network interface 1104, coupled via a computer bus 1105 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard disk drive), a removable memory device (e.g., diskette), flash memory, etc. The memory may be considered a computer readable storage medium.

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of influencing a behavior of an enterprise process, comprising the steps of:
    generating provenance data, wherein the provenance data is based on collected data associated with at least a partial actual execution of the enterprise process and is indicative of a lineage of one or more data items;
    generating a provenance graph that provides a visual representation of the generated provenance data, wherein nodes of the graph represent records associated with the collected data and edges of the graph represent relations between the records;
    analyzing at least a portion of the generated provenance data from the graph to generate an execution pattern corresponding to the at least partial actual execution of the enterprise process;
    comparing the execution pattern to one or more previously stored patterns; and
    determining whether or not to alter the enterprise process based on a result of the comparison,
    wherein one or more of the steps of generating, analyzing, comparing and determining are performed by a computer.

2. The method of claim 1, wherein the one or more previously stored patterns comprise one or more recommended execution patterns.

3. The method of claim 2, wherein the enterprise process is altered when a discrepancy is determined between the execution pattern and the one or more recommended execution patterns.

4. The method of claim 1, wherein the one or more previously stored patterns comprise one or more non-recommended execution patterns.

5. The method of claim 4, wherein the enterprise process is altered when a match is determined between the execution pattern and the one or more non-recommended execution patterns.

6. The method of claim 1, wherein the enterprise process is altered during the execution thereof.

7. The method of claim 1, wherein the altering of the enterprise process further comprises stopping the enterprise process.

8. The method of claim 1, wherein the altering of the enterprise process further comprises sending an alert and continuing the enterprise process.

9. The method of claim 1, wherein the altering of the enterprise process further comprises stopping the enterprise process and starting a new enterprise process.

10. Apparatus for influencing a behavior of an enterprise process, comprising:
    a memory; and
    a processor coupled to the memory and configured to:
    generate provenance data, wherein the provenance data is based on collected data associated with at least a partial actual execution of the enterprise process and is indicative of a lineage of one or more data items;

generate a provenance graph that provides a visual representation of the generated provenance data, wherein nodes of the graph represent records associated with the collected data and edges of the graph represent relations between the records;

analyze at least a portion of the generated provenance data from the graph to generate an execution pattern corresponding to the at least partial actual execution of the enterprise process;

compare the execution pattern to one or more previously stored patterns; and determine whether or not to alter the enterprise process based on a result of the comparison.

11. The apparatus of claim 10, wherein the one or more previously stored patterns comprise one or more recommended execution patterns.

12. The apparatus of claim 11, wherein the enterprise process is altered when a discrepancy is determined between the execution pattern and the one or more recommended execution patterns.

13. The apparatus of claim 10, wherein the one or more previously stored patterns comprise one or more non-recommended execution patterns.

14. The apparatus of claim 13, wherein the enterprise process is altered when a match is determined between the execution pattern and the one or more non-recommended execution patterns.

15. The apparatus of claim 10, wherein the enterprise process is altered during the execution thereof.

16. The apparatus of claim 10, wherein the altering of the enterprise process further comprises stopping the enterprise process.

17. The apparatus of claim 10, wherein the altering of the enterprise process further comprises sending an alert and continuing the enterprise process.

18. The apparatus of claim 10, wherein the altering of the enterprise process further comprises stopping the enterprise process and starting a new enterprise process.

19. An article of manufacture for influencing a behavior of an enterprise process, the article comprising a computer readable storage medium including program code which when executed by a computer performs the steps of:

generating provenance data, wherein the provenance data is based on collected data associated with at least a partial actual execution of the enterprise process and is indicative of a lineage of one or more data items;

generating a provenance graph that provides a visual representation of the generated provenance data, wherein nodes of the graph represent records associated with the collected data and edges of the graph represent relations between the records;

analyzing at least a portion of the generated provenance data from the graph to generate an execution pattern corresponding to the at least partial actual execution of the enterprise process;

comparing the execution pattern to one or more previously stored patterns; and determining whether or not to alter the enterprise process based on a result of the comparison.

20. The article of claim 19, wherein the enterprise process is altered during the execution thereof.

* * * * *